INVENTORS
RAYMOND H. HOSKINS
BY BERNARD H. SOFFER

*Elliott & Pastoriza*
ATTORNEYS

United States Patent Office 3,503,006
Patented Mar. 24, 1970

3,503,006
SOLID STATE LASER DEVICE INCLUDING LANTHANUM OXIDE AS THE HOST MATERIAL
Raymond H. Hoskins, San Pedro, and Bernard H. Soffer, Northridge, Calif., assignors to Union Carbide Corporation, a corporation of New York
Filed Apr. 30, 1964, Ser. No. 363,901
Int. Cl. H01s 3/00; C09h 1/04
U.S. Cl. 331—94.5                   5 Claims

ABSTRACT OF THE DISCLOSURE

A solid state laser device including a host crystal of lanthanum oxide doped with from .01 to 10 atom percent of neodymium to provide the lasering ions is provided.

---

This invention relates generally to laser devices and more particularly to an improved solid state laser device using lanthanum oxide as the host crystal.

Certain types of solid state devices for effecting laser action are now well known in the art. These devices include a host crystal doped with a primary additive to provide the laser ions. The stimulated emission of radiation is effected by pumping optical energy into the crystal to provide an inverted population between two energy levels of the laser ions. Regenerative means in the form of end coatings of high reflectance or alternatively end mirrors or semi-transparent surfaces adjacent the opposite ends of the crystal are provided to stimulate the coherent emission of monochromatic light of a wave length and frequency corresponding to the energy difference between the predetermined energy levels. The emitted light may be coupled out of the system through a small opening in one of the end reflectors or through one of the end reflectors when only a partially reflecting surface is provided.

Many of the solid state host crystals in which laser action has been realized are difficult to grow and thus are limited in size. As a consequence, power output is limited as compared to a crystal which may be grown to a relatively large size. Moreover, the cost of presently known rare earth host crystals is very high.

In addition to the foregoing, the physical properties of the crystal host material itself may be undesirable. For example, the crystal may be soft and have a low melting point. Also, a solid state host crystal may lack the optical transparency or clarity over a broad spectral band required to effect efficient laser action and particularly, to provide a narrow beam. Efficient laser action is also inhibited when the fluorescent emission characteristics are distributed over several peaks.

Finally, many solid state crystal host materials require charge compensation necessitating the use of a secondary additive in the powder during the crystal growing operation. Such charge compensation procedures often lead to a tendency for the laser material to color or darken under optical pump illumination, thereby detrimentally affecting, or even preventing laser action.

With the above in mind, it is accordingly a primary object of this invention to provide a new solid state laser device in which many of the foregoing problems are overcome.

More particularly, it is an object to provide a new solid state laser device which is considerably easier to grow to the end that a relatively large host crystal may be fabricated.

Another important object is to provide a laser host crystal material which is considerably less expensive, up to a factor of one tenth the cost of other host crystals.

Other objects are to provide a solid state laser device including a host crystal which is hard and has a high melting point.

Still another object is to provide a solid state laser host crystal of extremely high optical transparency or clarity over a broad spectral band to the end that an efficient laser operation is provided.

Another object is to synthesize a solid state laser host crystal characterized by a relatively large fluorescent emission in a single line or peak to thereby provide a lower threshold and greater efficiency of laser operation.

A particularly important object is to provide a new solid state laser in which the isomorphic substitution of the laser ion in the crystal lattice of the host crystal can be effected without charge compensation and its resulting problems.

Another object is to provide a new solid state laser for emitting output radiation of frequencies different from frequencies generated in solid state lasers heretofore available.

Briefly, these and other objects and advantages of this invention are attained by providing a host crystal of lanthanum oxide containing neodymium ions as the primary additive. The physical properites of the lanthanum oxide crystal, such as ease of growth, hardness, high melting point, fluorescent emission in one line, and a large optical transparency over a broad spectral band, enable the various objects to be realized.

A better understanding of the new laser device of this invention will now be had by referring to a detailed description of one embodiment thereof in conjunction with the accompanying drawings, in which.

Figure 1:
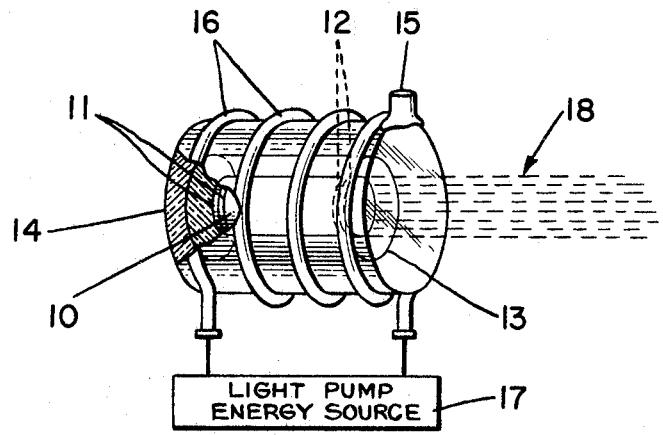
FIGURE 1 is a schematic perspective view of the basic components making up the laser device of this invention.

Referring first to FIGURE 1, the laser crystal is shown at 10 and in accordance with this invention comprises lanthanum oxide, ($La_2O_3$) containing neodymium ions ($Nd^{+3}$) as the primary additive. Opposite end surfaces of the host crystal are carefully ground to exact parallel relationship and are provided with regeneration means in the form of dielectric coatings 11 and 12. The dielectric coatings may consist of alternate layers of magnesium fluoride and cerium oxide of quarter wave length thicknesses at a center frequency corresponding to approximately 1.08 microns. The multilayer dielectric coatings are such as to provide high reflectance between wave lengths of 1.06 to 1.09 microns.

In the particular example illustrated in FIGURE 1, the laser crystal 10 with the end coatings 11 and 12 is sealed within a Pyrex transparent tube 13 in turn surrounded by a Dewar vessel 14 for providing cooling. Towards this end, liquid nitrogen may be introduced at 15 to hold the crystal at a temperature of substantially 77° K. Optical pumping means is provided in the form of a spiral flash lamp 16 surrounding the Dewar vessel 14 and connected to a suitable energy source 17. The stimulated laser beam passes through the coatings 12 as indicated at 18.

In the embodiment of the laser device illustrated in FIGURE 1, the host crystal of lanthanum oxide was grown by the flame fusion method with the neodymium added in the proportion of about 2 atom percent of $Nd^{+3}$. However, it is possible to vary the atom percent of the neodymium ion from $\frac{1}{100}$ atom percent to 10 atom percent.

The grown crystal was then fabricated into a generally cylindrical shape with flat parallel ends for coating with the dielectric multilayer coatings 11 and 12 as described.

Figure 2:
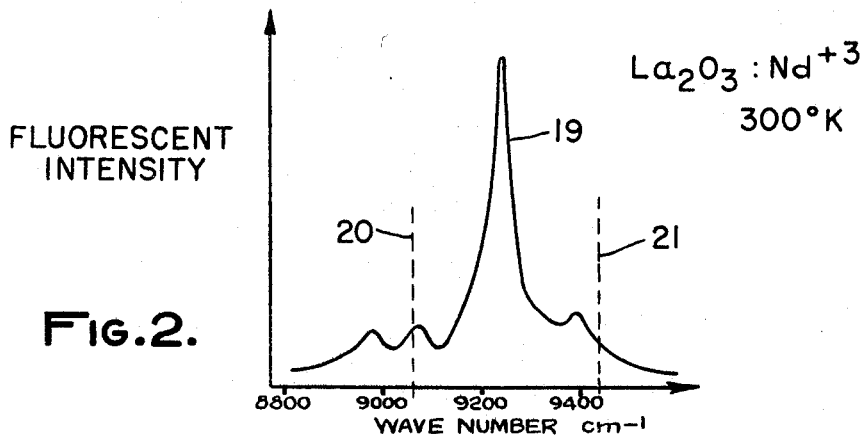
FIGURE 2 illustrates the fluorescent intensity characteristic of the device as a function of wave number over a given spectral band at approximately room temperature; and, FIGURE 3 illustrates the fluorescent characteristic over the same spectral band at a temperature of 77° K.

Referring to FIGURE 2, the fluorescent characteristic of the $La_2O_3:Nd^{+3}$ at room temperature or approximately 300° K. is shown. The abscissas in FIGURE 2 are expressed in wave numbers which constitute the reciprocals of the wave lengths in inverse centimeters. Therefore, the abscissas are directly proportional to the frequencies of radiation resulting from fluorescence in the crystalline structure.

In FIGURE 2 it will be noted that fluorescent emission is concentrated in a single major peak 19 at a wave number of approximately 9210 cm.$^{-1}$.

Figure 3:
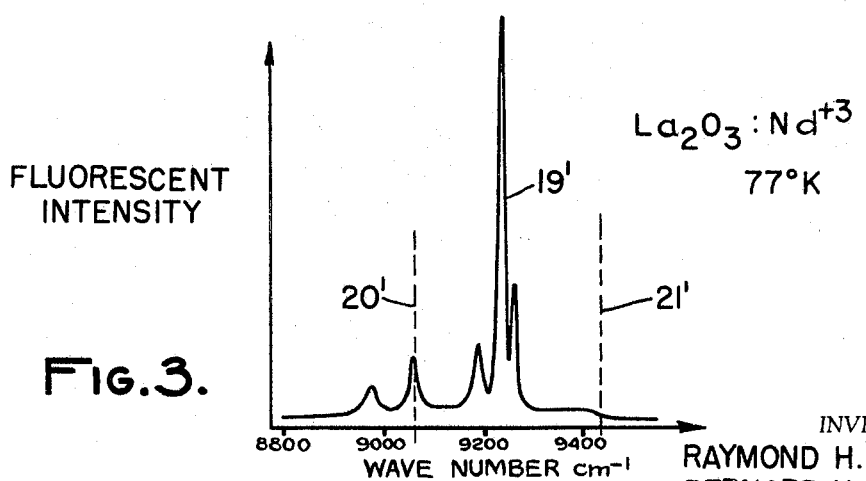

FIGURE 3 shows the fluorescent intensity characteristic of the laser crystal when cooled to a temperature of 77° K. The fluorescent peak corresponding to 19 of FIGURE 2 is indicated at 19' in FIGURE 3. As a consequence of the cooling, the height of the peak increased considerably and the width decreased to approximately one-fourth. The ordinate scale in FIGURE 3 is different from that in FIGURE 2 in order to accommodate the peak on the drawing.

In FIGURE 3 the spectral band at which high reflectance is provided by the multilayer dielectric coatings 11 and 12 referred to in FIGURE 1 is defined by the vertical dash lines 20 and 21. This high reflectance thus occurs in a band including the maximum intensity peak 19' and it is at this peak that laser action is observed.

In the operation of the device of FIGURE 1, stimulated emission was observed at 77° K. at a wave number of 9265 cm.$^{-1}$ as monitored by an S-1 photomultiplier tube at the exit slit of a Bausch and Lom monochromator.

The neodymium ions in the lanthanum oxide host crystal have a four level energy characteristic. The terminal energy level contains relatively few of the neodymium ions or, stated differently, is of a relatively low population. The fluorescent lifetime of the major peak depicted in FIGURE 3, on the other hand, provides sufficient time to pump ions into higher energy levels to effect a population inversion without requiring too large a peak power from the spiral flash lamp.

The excellent transparent characteristics of the lanthanum oxide crystal over a broad spectral band and the concentration of the fluorescence in a single peak and a relatively lower threshold requirement of optical energy, lead to efficient laser operation. Further, the $La_2O_3$ crystal lattice is such that isomorphic substitution of tri-valent rare earth ions such as the $Nd^{+3}$ can be effected without the complications of charge compensation.

Finally, it will be evident from FIGURE 3 that emitted radiation frequencies corresponding to the line 19' is different from frequencies heretofore emitted by solid state lasers.

From the foregoing description, it will be evident that the present invention has provided a new solid state laser device having distinct features and advantages over solid state laser devices fabricated heretofore. While only one particular embodiment of the laser device has been shown and described in the accompanying drawings, the laser characteristics of the lanthanum oxide host crystal containing neodymium ions are not to be thought of as limited to the particular values set forth.

What is claimed is:
1. A solid state laser device comprising: a host material constituting a single crystal of $La_2O_3$ containing from .01 to 10 atom percent of $Nd^{+3}$ ions with given energy levels; regeneration means exhibiting high reflectance at given wave lengths optically coupled to opposite end portions of said crystal; and optical pumping means coupled to said crystal for effecting an inverted population state of said $Nd^{+3}$ ions between certain ones of said given energy levels whereby stimulated radiation is emitted from said crystal at a frequency corresponding to the energy difference between said certain ones of said given energy levels and at wave lengths corresponding to said given wave length.

2. A device according to claim 1, including temperature control means in the form of a Dewar vessel containing liquid nitrogen surrounding said crystal for holding the temperatures of said crystal at a given value below the ambient temperature.

3. A device according to claim 1, in which said crystal has end faces, said regeneration means comprising multilayer dielectric coatings on said end faces providing high reflectance at wave lengths corresponding to said frequencies at which stimulated radiation is emitted.

4. A device according to claim 1, in which said host crystal exhibits a fluorescent peak at a wave length of substantially 1.079 microns, and in which said given energy levels are at least four in number, there being a relatively small $Nd^{+3}$ ion population in the fluorescent terminal level compared to said atom percent so that the peak power and total energy of pumping to effect an inverted population level between higher energy levels and said fluorescent terminal level is effectively decreased as a consequence of said energy level states.

5. A device according to claim 1, in which said crystal has flat parallel end faces, said regeneration means comprising multilayer dielectric coatings providing high reflectance at wave lengths between 1.06 and 1.09 microns, said frequency of emitted radiation corresponding to a wave length of 1.079 microns.

References Cited

UNITED STATES PATENTS

| 3,130,254 | 4/1964 | Sorokin et al. | 331—94.5 |
| 3,254,031 | 5/1966 | De Paolis | 252—301.4 |
| 3,293,564 | 12/1966 | Fan | 331—94.5 |

OTHER REFERENCES

McClung et al. "Optical Maser Action in the $R_2$ Line in Ruby," Bull. Am., Physical Soc. vol. 6, No. 6, p. 511, Dec. 27, 1961.

Ropp "Spectral Properties of Rare Earth Oxide Phosphors," Jour. of the Electrochemcial Society, March 1964, vol. 111, No. 3, pp. 311–317.

RONALD L. WIBERT, Primary Examiner

U.S. Cl. X.R.

252—301.4